C. J. ROTTMANN.
STANDARD CELL.
APPLICATION FILED SEPT. 13, 1919.
1,379,698.
Patented May 31, 1921.
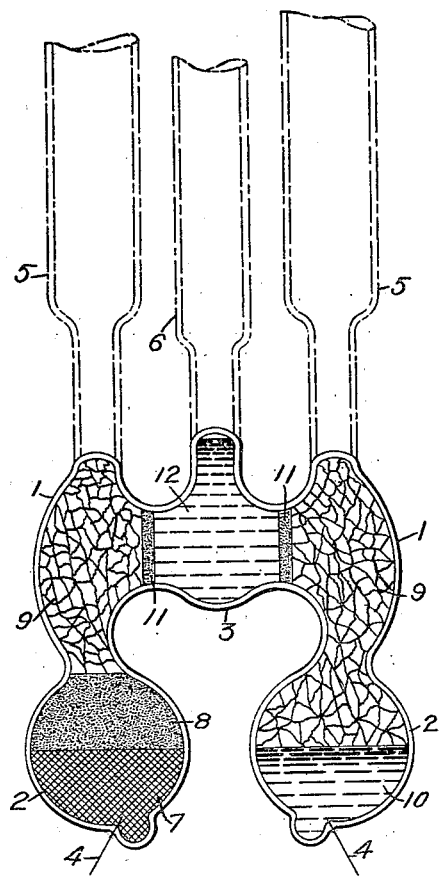
WITNESSES:
INVENTOR
Clarence J. Rottmann
BY
ATTORNEY

UNITED STATES PATENT OFFICE.

CLARENCE J. ROTTMANN, OF WILKINSBURG, PENNSYLVANIA, ASSIGNOR TO WESTINGHOUSE ELECTRIC & MANUFACTURING COMPANY, A CORPORATION OF PENNSYLVANIA.

STANDARD CELL.

1,379,698.  Specification of Letters Patent.  Patented May 31, 1921.

Application filed September 13, 1919. Serial No. 323,369.

*To all whom it may concern:*

Be it known that I, CLARENCE J. ROTTMANN, a citizen of the United States, and a resident of Wilkinsburg, in the county of Allegheny and State of Pennsylvania, have invented a new and useful Improvement in Standard Cells, of which the following is a specification.

My invention relates to standard cells and more particularly to standard cells of the Weston or Clark types which are used as voltage standards in electrical work where their value depends upon the constancy of the potential of each particular cell and upon the agreement of this value among separate cells.

The primary object of my invention resides in providing a standard cell of this character so constructed as to not only insure greater constancy of each cell and greater uniformity of electromotive force among the various cells but also to insure a longer life for the cell.

It has been found that cells of the above character do not maintain a constant electromotive force over a very long period of time because of secondary reactions taking place within the cell upon standing. These reactions may arise from impurities in the chemicals used, the action of light, electrolytic action, solution of the glass of the containing vessel, action on the leading-in wires and the like.

For this reason, one of the objects of my invention consists in constructing the body or container of the cell of a material which will be less affected by the chemicals employed and providing leading-in wires of a metal which will not react with the cell contents and which will not become polarized. I have ascertained that this result may be accomplished by utilizing hard glass and leading-in wires of tungsten, which may contain a small percentage of thoria, instead of the soft glass or soda glass and platinum leading-in wires which have previously been employed.

Standard cells of the usual types are materially injured by rough handling so that the value of a cell is quite likely to change when being transported from place to place. For this reason, a still further object of my invention comprises the construction of a standard cell in such manner as to overcome this defect to a considerable extent.

These and other objects will become more fully apparent from a consideration of the drawing, which is an elevation of a standard cell constructed in accordance with my invention, together with the following more detailed description.

The body of my improved cell, which may preferably be formed of hard glass, such as 702 P may be in the form of a hollow or tubular body of inverted U-shape with each side or leg portion restricted intermediate its length to provide upper and lower chambers 1 and 2 and with its connection portion, which may be restricted near its junctures with the side portions, providing an intermediate chamber 3. This whole body, when the cell is finished, is tightly sealed and leading-in wires 4 of tungsten or tungsten with a small percentage of thoria or other radioactive substances are sealed into the bottom walls of the lower chambers 2.

While this cell body may be formed in any suitable manner readily occurring to glass workers, I have found that it may be constructed by forming the side portions at the ends of glass tubes indicated in broken lines at 5 and the intermediate portion at the end of a glass tube correspondingly indicated at 6, these tubes being drawn or sealed off after the cell is completed.

Heretofore, to the best of my knowledge, standard cells have been formed of soft glass or soda glass with leading-in wires of platinum. The platinum wires sealed into soft glass form a seal which may crack upon standing thus admitting air and short circuiting the cell. Such cells, furthermore, have been unsatisfactory, as the chemicals employed within the cell react with the glass. I have found, however, that by employing leading-in wires of tungsten, either pure or containing small amounts of thoria, the wires may be perfectly sealed into hard glass, which is relatively inert to the cell contents. The wires will not react with the chemicals and having substantially the same coefficient of expansion as the glass, the seals will not crack.

The chemicals employed in my cell may be any of those customarily employed in standard cells of this character, and, for the sake of illustration, I have shown the electrochemical cycle of the Weston cell comprising mercury, a thick paste of mercurous sulfate, and a saturated solution of cadmium sulfate with cadmium sulfate crystals, cadmium sulfate, and cadmium amalgam. In place of this cylce, I may, however, employ that of the Clark cell which is the same with the substitution of zinc for cadmium in the amalgam and of zinc sulfate for cadmium sulfate.

As best shown in the drawing, one of the lower chambers 2 may be approximately half filled with mercury 7 and above the mercury with a thick paste 8 of mercurous sulfate and a saturated solution of cadmium sulfate. The restricted portion of the same side of the body and the upper chamber 1 thereof, as well as the corresponding chamber and restricted portion of the other side of the body and upper portion of the lower chamber 2 thereof may be filled with small crystals 9 of cadmium sulfate to which is added a small quantity of a saturated solution of cadmium sulfate to displace all air. The crystals of cadmium sulfate in the last mentioned leg of the body may be supported upon a substantially 12.5% cadmium amalgam 10 which fills the lower half of the lower chamber 2.

Porous diaphragms 11, disposed in the restricted portions of the body at the juncture of its intermediate portion 3 and side portions close the intermediate portion 3 which is filled with a saturated solution of cadmium sulfate 12. These porous diaphragms may be of any suitable material such, for example, as voltameter porcelain.

From the foregoing description, it will be apparent that when the chemicals have been placed in the cell and the tubes 5 and 6 have been sealed off by fusion, the cell contents will not only be closely packed in the cell but will be firmly held in their respective chambers. For this reason, there will be no shifting of the solid contents from one part of the cell to another even though the cell is roughly handled or inverted for a considerable length of time, the solid contents being firmly held in position, the solid components of one leg of the cell being separated from those of the other by the diaphragms so that there is no opportunity for them to mix with each other. At the same time the diaphragms allow diffusion of the cadmium sulfate solution thus making it permeable to the ions.

I have found that, by practising my invention as above indicated, I may obtain a greater number of cells with the correct standard electromotive force than is possible when making the cells according to the old methods, that the resulting cell is more durable and long lived and that it may be more roughly handled without affecting its accuracy.

Although I have described my invention in considerable detail, it will be appreciated that no limitations are to be imposed upon it other than those indicated in the claims.

I claim as my invention:

1. In a standard cell a containing vessel of hard glass and leading-in wires of tungsten.

2. In a standard cell a containing vessel of hard glass and leading-in wires of tungsten containing a small percentage of thoria.

3. In a standard cell a containing vessel having restricted portions at spaced intervals to define a plurality of communicating chambers.

4. In a standard cell, a closed tubular containing vessel of U-shape, the side portions of which are restricted intermediate their length.

5. In a standard cell a closed tubular containing vessel of U-shape, the side portions of which are restricted intermediate their length, and porous diaphragms disposed across the vessel at the junctures of its side and intermediate portions.

6. A standard cell comprising a hollow containing vessel filled with a plurality of localized chemicals, the vessel having restricted portions to maintain the chemicals in their localized positions.

7. A standard cell comprising a containing vessel, liquid and solid chemicals filling the vessel, and porous diaphragms separating the liquid filled portion of the vessel from the solid chemicals therein.

8. A standard cell comprising a containing vessel, liquid and solid chemicals filling the vessel, and porous diaphragms separating the liquid filled portion of the vessel from the solid chemicals therein, the vessel being provided with restricted portions at intervals to retain the solid chemicals in their localized positions.

9. A standard cell comprising a containing vessel of hard glass, leading-in wires of tungsten, liquid and solid chemicals filling the vessel, porous diaphragms separating the liquid from the solid chemicals and means tending to maintain the solid chemicals in localized positions.

In testimony whereof, I have hereunto subscribed my name this 29th day of Aug. 1919.

CLARENCE J. ROTTMANN.